June 23, 1942.   S. S. BERNSTEIN   2,287,226
SECURING MEANS
Filed Nov. 18, 1940
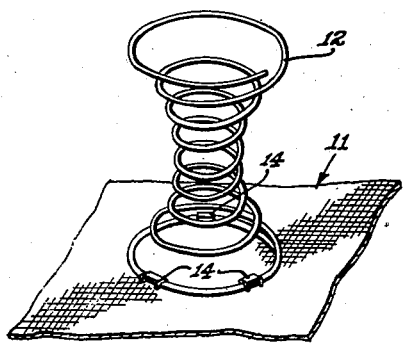
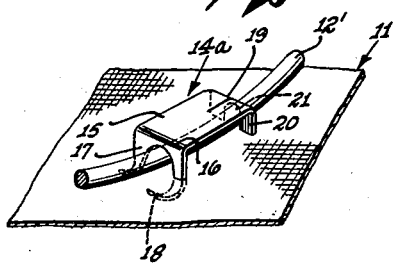
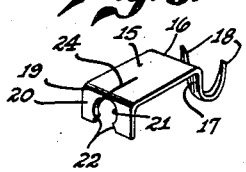
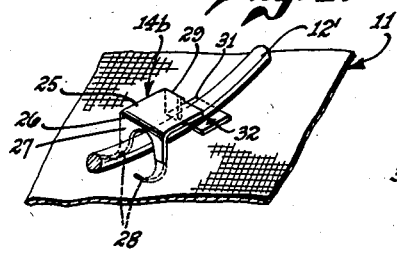
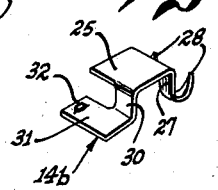
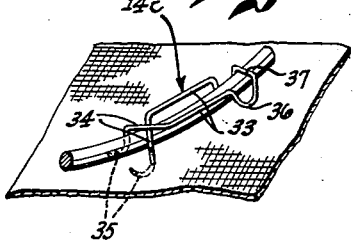
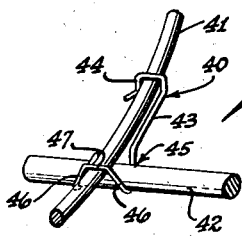
Inventor
SAMUEL S. BERNSTEIN,
By
Attorney Patented June 23, 1942

2,287,226

UNITED STATES PATENT OFFICE 2,287,226

SECURING MEANS

Samuel S. Bernstein, Los Angeles, Calif., assignor to B. and F. Corporation, a corporation of California Application November 18, 1940, Serial No. 366,100

7 Claims. (Cl. 24—85)

This invention relates generally to fastening devices and more particularly to fasteners or securing means for use in attaching coil springs to spring supporting fabric or webbing such as is used in upholstery construction.

In upholstery construction it is common practice to attach the coil springs to a supporting fabric or webbing by means of twine. This type of construction is disadvantageous in that it requires considerable time to effect the fastening of the springs to the fabric and in that the means itself is not a positive securing means. In this connection it has been found that the twine either breaks or works loose thereby permitting shifting of the springs.

Therefore it is a primary object of this invention to provide a new and improved means for attaching coil springs and other objects to a spring supporting fabric or webbing or to other elements. It is a particular object of the invention to provide a new and improved fastener which may be readily installed by hand and when installed will serve to securely anchor the attached object to the element to which it is attached.

It is also an object to provide a fastener of simple construction and relatively inexpensive to produce.

It is a further object to provide a securing means which may be used to fasten together two crossing members such as a pair of crossed wires or the like.

These and other objects will be apparent from the drawing and the following description. Referring to the drawing which is for illustrative purposes only:

Fig. 1 is a perspective view of a coil spring shown in position on a fragmentary portion of a spring supporting fabric and attached thereto by fasteners embodying a form of the invention;

Fig. 2 is a perspective view of a fastener embodying one form of the invention shown with relation to a portion of the lower coil of a spring and a portion of a spring supporting fabric;

Fig. 3 is a perspective view of the opposite end of the fastener shown in Fig. 2;

Fig. 4 is a perspective view of a fastener embodying another form of the invention shown with relation to a portion of the lower coil of a spring and a portion of a spring supporting fabric;

Fig. 5 is a perspective view of the opposite end and side of the fastener shown in Fig. 4;

Fig. 6 is a perspective view partly in section of a wire fastener embodying another form of the invention shown with relation to an attached object and a portion of fabric; and Fig. 7 is a perspective view of a fastening element embodying another form of the invention shown with relation to a fragment of a lower coil of a spring attached to a supporting wire fragmentarily shown.

More particularly describing the invention, Fig. 1 generally illustrates one usage of the fastening means of this invention. Reference numeral 11 generally indicates a fragmentary portion of a spring supporting fabric or the like upon which is shown a coil spring 12. In actual upholstery construction any suitable number of coil springs are positioned on the spring supporting fabric. The spring 12 is fastened to the fabric by means of the fastening elements 14 which are shown located at spaced points around the lower coil of the spring. Ordinarily three such fastening elements are sufficient for securely attaching each spring to the fabric.

Referring to Figs. 2 and 3 for a more detailed description of one form of the invention, the fastener 14a is shown with relation to a part of the lower coil 12' of a coil spring. The fastener is preferably formed of a thin strip of metal and comprises a flat top or intermediate portion 15 which is bent at 16 and terminates at one end in a forward portion 17 which is adapted to fit over or straddle the coil section 12' and terminates in a pair of downwardly extending and upwardly curved prongs 18. At its opposite end the intermediate portion 15 is bent at 19 to form a rear or depending portion 20 which is provided with a notch 21 adapted to accommodate or slip over the spring section 12'. If desired, the notch 21 may be provided with outwardly flared outer edge portions 22 to facilitate snapping of the fastener on to the spring section 12'. To further facilitate this operation the rear portion and a part of the top portion is parted or slit at 24. This slit makes it possible to accommodate more than one thickness of wire.

In the operation of this fastener the prongs are first inserted in the fabric on opposite sides of the spring 12 by holding the fastener in an upright position or slightly tilted forward until the prongs engage and pierce the fabric after which the fastener is pivoted or inclined rearwardly until it is approximately parallel to the spring section 12' and it is then snapped over the spring section.

In Figs. 4 and 5 there is shown another form of fastener indicated by 14b which comprises an intermediate or top portion 25 which is bent at 26 and terminates at its forward end in a forward portion 27. The forward portion is comprised principally of a pair of prongs 28 bent forwardly and upwardly with relation to the top portion and adapted to engage a fabric 11 and straddle the spring section.

The opposite end of the intermediate portion 25 terminates in a bend 29 from which extends a downwardly or angularly disposed connecting portion 30. This connecting portion is preferably formed substantially less than the width of the intermediate or top portion. Extending rearwardly of the lower end of the connecting portion 30 is a base or rear portion 31 which is substantially as wide as the top portion in order that it may engage the under surface of a spring section. This base is preferably provided with a projection 32.

With this form of the invention the fastener is installed in substantially the same manner as the fastener shown in Figs. 2 and 3 except that the rear or base portion 31 is slipped under the spring section rather than snapped thereto as in the case of the previously described form of the invention. The projection 32 serves to hold the base of the fastener under the coil of the spring so that it will not accidentally slip out.

In Fig. 6 there is shown another form of the invention which comprises a fastener 14c preferably formed of a length of spring wire. The wire is bent to form two parallelly disposed intermediate or top sections 33 terminating at their forward ends in downwardly or angularly extending crossed portions 34. The extremities of the crossed portions are curved and pointed at their outer ends to form prongs 35. At their opposite ends the intermediate portions 33 each terminate in what will be termed a U-shaped portion 36. Each of the U-shaped portions are connected by a bridging portion 37 adapted to extend over a spring section.

The fastener of Fig. 6 is installed by inserting the prongs in the fabric and then snapping the rear portion down over the coil, the same as in Figs. 2 and 3. In this connection the two U-shaped portions 36 are formed to converge slightly at their lower ends so the fastener must be snapped over the coil of the spring and when snapped into position will remain there.

Referring to Fig. 7 there is shown a fastener element 40 which is particularly designed for the purpose of securing springs, especially hourglass type to a spring support made of wire. This fastener consists of a single spring wire bent to form an intermediate section 43 which terminates in a hook or saddle 44 extending angularly thereto and adapted to fit over the coil section 41. At its opposite end the intermediate portion 43 terminates in what will be termed a cradle means 45 consisting of the two laterally spaced portions 46 separated and connected by a bridge portion 47.

In installing the fastener 40 the cradle portion 45 is first hooked around the wires 41 and 42 to a position substantially as shown and the portions 43 and 44 are then bent upwardly so that the portion 44 can be snapped over the member 41. While the fastener has been designed for use in attaching a coil spring to wires, it is contemplated that it may be used for attaching various other types of objects together.

Although the invention has been particularly shown and described, it is contemplated that various changes and modifications might be made without departing from the scope of the invention and it is intended to cover such changes as come within the scope of the claims.

I claim as my invention:

1. A fastener formed of metal for use in attaching a section of a coil spring or the like to a supporting member comprising an intermediate portion adapted to be disposed closely adjacent and longitudinally of a section of the spring to be attached, a forward portion adapted to straddle the spring section and extending away from the plane of the intermediate portion and terminating in a pair of curved prongs adapted to engage the supporting member, and a rear portion extending away from the plane of the intermediate portion on the same side thereof as said forward portion and adapted to engage the spring section.

2. A fastener formed of metal for use in attaching a section of a coil spring or the like to a supporting fabric comprising an intermediate portion adapted to be disposed closely adjacent and longitudinally of a section of the spring to be attached, a forward portion adapted to straddle the spring section and extending away from the plane of the intermediate portion and terminating in a pair of fabric engaging prongs, and a divided rear portion adapted to be snapped onto and engage said spring section, said rear portion extending away from said intermediate portion on the same side thereof as said forward portion.

3. A fastener comprising an intermediate portion, a rear portion extending angularly from said intermediate portion having a notch at its outer end, and a forward portion extending angularly from the opposite end of said intermediate portion terminating in a pair of curved prongs, said forward and rear portions extending to the same side of said intermediate portion.

4. A metal fastener comprising a flat top portion, a downwardly extending rear portion, said rear portion being notched at its lower end, and a downwardly extending front portion terminating in a pair of forwardly curved prongs, the ends of said prongs being upwardly curved, said top and rear portions being provided with a slit extending from the top of said notch to said top portion and forwardly in said top portion a limited distance.

5. A fastener comprising an intermediate portion; a connecting portion extending angularly from said intermediate portion and being of less width, a rear portion substantially parallel to and of substantially the same width as said intermediate portion, and a forward portion extending angularly from the opposite end of said intermediate portion terminating in a pair of curved prongs, said rear and forward portions being on the same side of the plane of said intermediate portion.

6. A fastener comprising an intermediate portion; a connecting portion extending angularly from said intermediate portion and being of less width, a rear portion substantially parallel to and of substantially the same width as said intermediate portion, said rear portion being provided with a projection on its upper surface spaced laterally from said connecting portion, and a forward portion extending angularly from the opposite end of said intermediate portion and on the same side thereof as said rear portion terminating in a pair of curved prongs.

7. A fastener comprising a length of wire bent to form a pair of parallelly disposed intermediate sections, a rear transverse bridge portion, depending "U" portion joining said top portions and said bridge portion, and two downwardly extending portions, said last named portions terminating in forwardly and upwardly curved prongs, said wire being crossed over between said intermediate sections and said front portions.

SAMUEL S. BERNSTEIN.